(12) United States Patent
Kikuiri

(10) Patent No.: US 6,473,273 B1
(45) Date of Patent: Oct. 29, 2002

(54) ROTARY HEAD ASSEMBLY

(75) Inventor: Katsuya Kikuiri, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/533,572

(22) Filed: Mar. 23, 2000

(30) Foreign Application Priority Data

Mar. 29, 1999  (JP) ............................................. 11-085880

(51) Int. Cl.$^7$ ..................... G11B 21/04; G11B 21/18; G11B 5/52
(52) U.S. Cl. .................................................. 360/271.5
(58) Field of Search .................. 360/271.5, 271.1, 360/271, 270, 240, 110, 316, 317

(56) References Cited

U.S. PATENT DOCUMENTS

| | | | |
|---|---|---|---|
| 4,539,615 A | * 9/1985 | Arai et al. .................... 360/121 |
| 4,546,541 A | 10/1985 | Reid ........................ 29/603.14 |
| 4,571,651 A | 2/1986 | Reid et al. .................. 360/316 |
| 4,609,960 A | 9/1986 | Fujioka .................... 360/281.7 |
| 4,633,332 A | * 12/1986 | Higurashi et al. ............ 386/74 |
| 4,905,103 A | * 2/1990 | Ohira ........................... 360/64 |
| 5,132,861 A | * 7/1992 | Behr et al. .................... 360/121 |
| 5,193,045 A | * 3/1993 | Kochi et al. .................... 360/84 |
| 5,307,217 A | * 4/1994 | Saliba .......................... 360/76 |
| 5,719,724 A | * 2/1998 | Kawaguchi .................... 360/84 |
| 5,886,843 A | * 3/1999 | Ozue et al. .................... 360/64 |
| 5,923,281 A | * 7/1999 | Vopat .......................... 342/117 |

* cited by examiner

Primary Examiner—Robert S. Tupper
Assistant Examiner—Julie Anne Watko
(74) Attorney, Agent, or Firm—Brinks Hofer Gilson & Lione

(57) ABSTRACT

A rotary head assembly including a plurality of magnetic heads with predetermined azimuth angles. These magnetic heads are formed by mounting MR elements of MR heads and magnetic gaps in inductive heads so that they are exposed from an outer periphery of a rotary drum. End portions of the MR elements of the MR heads are positioned at the same height $H_0'$, and end portions defining the magnetic gaps in the inductive heads are positioned at the same height $H_0$. The rotary head assembly is used in a helical-scanning-type magnetic recording and reproducing apparatus, which includes MR heads and inductive heads and which can provide a large reproducing operation output when forming azimuth angles at the magnetic gaps using thin-film magnetic heads.

2 Claims, 8 Drawing Sheets

ROTARY HEAD ASSEMBLY

BACKGROUND OF THE INVENTION

1. Field of the Invention

The present invention relates to a rotary head assembly, and more particularly to a rotary head assembly used in a helical-scanning-type magnetic recording and reproducing apparatus used with a magnetic tape.

2. Description of the Related Art

FIGS. 4A and 4B are used to illustrate a conventional helical-scanning-type magnetic recording and recording apparatus. More specifically, FIG. 4A is a perspective view of a rotary drum, and FIG. 4B is a schematic view illustrating a recording operation performed on a magnetic tape. FIGS. 5A and 5B are used to illustrate a thin-film magnetic head used in a magnetic recording and reproducing apparatus such as a hard disk apparatus. More specifically, FIG. 5A is a perspective view of the thin-film magnetic head, and FIG. 5B is a plan view of the main portion of the thin-film magnetic head shown in FIG. 5A. FIG. 6A illustrates a case where the thin-film magnetic head is used in a helical-scanning-type magnetic recording and reproducing apparatus. FIG. 6B illustrates a case where two such thin-film magnetic heads are used in the helical-scanning-type magnetic recording and reproducing apparatus. More specifically, FIG. 6A is a perspective view of a rotary head assembly in which the thin-film magnetic head is mounted to a base, and FIG. 6B is a development of the main portion of a side surface of a double-azimuthal-type rotary head assembly, in which the rotary head assembly of FIG. 6A is mounted to a rotary drum. FIG. 7 is a schematic view illustrating the movements of a magnetic tape recording surface and the magnetic heads when a recording/reproducing operation is carried out on the magnetic tape using the rotary head assembly of FIG. 6B. FIGS. 8A and 8B schematically illustrate a case where the magnetic tape is subjected to a recording operation and subsequently to a reproducing operation using the rotary head assembly of FIG. 6B. More specifically, FIG. 8A is an enlarged view of the main portion of FIG. 6B, and FIG. 8B is a schematic view illustrating the movements of the magnetic head recording surface and the magnetic heads when the magnetic tape is subjected to a recording operation and subsequently to a reproducing operation.

In a magnetic recording and reproducing apparatus, such as a VTR or a computer-data recording and reproducing apparatus, using a magnetic tape as a magnetic recording medium, a recording and a reproducing operation is carried out by helical scanning. Common helical-scanning-type magnetic recording and reproducing apparatuses use a plurality of heads to increase the recording density and data transfer rate. They come in various types. One such type is illustrated in FIG. 4A. In this type, a pair of magnetic heads H1 and H2 are disposed on opposite locations of a rotary drum D.

For example, single heads or combination heads may be provided. When single heads are provided one magnetic head H1 and one magnetic head H2 are provided. When combination heads are provided two magnetic heads H1 and two magnetic heads H2 are provided. Regardless of whether single heads or combination heads are used, when the rotary drum D is driven to subject a magnetic tape Tp to a recording operation using either one of the magnetic head H1 and the magnetic head H2 or either one of the pair of magnetic heads H1 and magnetic heads H2, guard bandless recording is carried out. When guard bandless recording is carried out, a track is subjected to recording so that the recording is carried out in an overlapping manner with respect to a portion of a different track that has just been subjected to recording by either one of the other of the magnetic head H1 and the magnetic head H2 or either one of the other of the pair of magnetic heads H1 and magnetic heads H2. For example, as shown in FIG. 4B, after a track T1 has been subjected to recording by the magnetic head H1, a track T2 is subjected to recording by a magnetic head H2 so that the recording is carried out in an overlapping manner with respect to a portion of a top end of the track T1.

When a recording/reproducing operation is carried out by helical scanning by single heads or by combination heads, an azimuthal recording/reproducing operation is carried out. In the azimuthal recording/reproducing operation, paths (or tracks) of magnetic gaps of the magnetic heads are disposed obliquely from a magnetic-tape-transporting direction, and the magnetic gaps in the magnetic heads are inclined by predetermined azimuth angles from a track widthwise direction. The azimuthal recording/reproducing operation carried out with single heads or combination heads is a double azimuthal recording/reproducing operation in which azimuth angles θ1 and θ2 of the magnetic gaps G1 and G2 in the respective magnetic heads H1 and H2 are formed by lines inclined in opposite directions, as shown in FIG. 4B. When the double azimuthal method is used, a track T1 to be subjected to a reproducing operation by the magnetic head H1 has an area overlapped by an adjacent track T2 which has been subjected to recording by the magnetic head H2. The double azimuthal method is carried out to eliminate crosstalk with the adjacent track T2 by making use of azimuthal loss in which the azimuth angle θ1 of the track T1 and the azimuth angle θ2 of the track T2 in this overlapping area have different sizes and are formed by lines extending in different directions. Similarly, when the track T2 is subjected to a reproducing operation by the magnetic head H2, azimuthal loss is made use of to eliminate crosstalk with the adjacent track T1. The azimuth angles θ1 and θ2 may be the same size.

Conventionally, MIG (metal-in-gap) heads, layered-type, heads, and the like have been used as magnetic heads in helical-scanning-type magnetic recording and reproducing apparatuses. In recent years, in order to achieve higher recording density of a magnetic recording medium in VTR and data recording and reproducing apparatuses, track widths have been made smaller and higher frequencies have been used. To decrease track widths, magnetic gap widths must be made smaller. However, in MIG heads, the magnetic gaps are formed by a cutting operation, making it difficult to make them smaller in size. Thus, track widths cannot be made smaller. In addition, to decrease track widths, abutting surfaces used to form magnetic gaps need to be polished with high precision. However, it is difficult to increase the precision with which the polishing is carried out in very small magnetic gaps. On the other hand, to make it possible to use higher frequencies, the inductance needs to be made low. However, in MIG heads and layered heads, the inductance cannot be made low. MIG heads and layered heads have the disadvantage that the reproducing operation output cannot be made large when higher recording density is to be achieved.

Various thin-film magnetic heads have already being used in magnetic recording and reproducing apparatuses, such as hard disk apparatuses. In general, there are two types of thin-film magnetic heads: inductive heads used primarily for recording operations, and magnetoresistive (MR) heads primarily used for reproducing operations. Composite-type thin-film magnetic heads in which such inductive heads and such magnetoresistive heads are placed upon each other into a layered structure are frequently used in magnetic recording and reproducing apparatuses. As shown in FIGS. 5A and 5B, in a thin-film magnetic head 1 used in a magnetic recording and reproducing apparatus such as a hard disk apparatus, a head element portion 3 and bonding pads 4 are formed at a side surface of a slider 2. The head element portion 3 comprises an MR head 3a and an inductive head 3b. The slider 2 is formed by cutting a wafer formed of a ceramic material such as aluminum oxide and titanium carbide ($Al_2O_3$.TiC). The inductive head 3b is placed on top of the MR head 3a to form a layered structure. The bonding pads 4 are connected to the MR head 3a and the inductive head 3b. The MR head 3a comprises an MR layer 3a1, an upper gap layer 3a2 formed on top of the MR layer 3a1, and a lower gap layer 3a3 formed closest to and below the slider 2. These three layers form a magnetoresistive (MR) element Ga. An upper shield layer 3a4 and a lower shield layer 3a5 provided above and below the MR element Ga so that the MR element Ga is disposed therebetween functioning as reproducing magnetic gaps during reproduction. The MR layer 3a1 detects any magnetic field that has entered the upper and lower shield layers 3a4 and 3a5.

The inductive head 3b comprises an upper core layer 3b1 and a lower core layer 3b2 also being the upper shield layer 3a4 of the MR head 3a. A nonmagnetic material layer 3b3 is formed between the upper and lower core layers 3b1 and 3b2 in order to form a recording magnetic gap Gb. A track width Tw at the magnetic gap Gb is determined by the length of the magnetic gap Gb in a longitudinal direction (or in a horizontal direction in FIG. 5B) thereof. The track width Tw is slightly longer (by approximately a few percent to slightly more than 10 percent but less than 20 percent) than the longitudinal length of the MR layer 3a1. The centers of the MR element Ga and the magnetic gap Gb as viewed in a direction of the track width Tw are made to lie on a centerline C. The MR element Ga and the magnetic gap Gb which are exposed from a top surface of the slider 2 form a layered structure, and are thus parallel to each other.

The four bonding pads 4, formed at a side surface of the slider 2, are connected to coils (not shown) of the inductive head 3b and the MR layer 3a1 of the MR head 3a by four leader wires (not shown).

Such a thin-film magnetic head can be mass-produced, and has the advantages of being small and being capable of providing high-precision recording and reproducing operations. The thin-film magnetic head makes it possible to easily carry out fine dimensioning, such as forming narrower gaps, to form tracks with smaller widths. As a result, it can provide high-density recording. In particular, an MR head can, regardless of its speed relative to a magnetic recording medium, directly respond to a signal magnetic field to provide a high reproducing operation output. In addition, the inductance value of an MR head is much lower than those of an MIG head and a layered-type head, so that it can be used with higher frequencies. To overcome the problems of such conventional magnetic heads, there has been a desire to incorporate the above-described thin-film magnetic recording heads in rotary heads and to apply them to a helical-scanning-type magnetic recording and reproducing apparatus used with a magnetic tape.

To apply the thin-film magnetic head 1 to a helical-scanning-type magnetic recording and reproducing apparatus used with a magnetic tape, it is formed so that the MR element Ga and the magnetic gap Gb are exposed from a side portion thereof, as shown in FIG. 6A. Then, it is mounted to a base 5. Circuit boards 6, such as flexible printed-wiring boards, connected to an external processing circuit are provided on the same surface of the base 5 as the thin-film magnetic head 1. Terminal portions 6a of the circuit boards 6 and the bonding pads 4 are connected by balls 7 formed by ball bonding, and the MR element Ga and the magnetic gap Gb are made to face an outer peripheral surface of the rotary drum D and are mounted at opposite locations of the rotary drum D, whereby a rotary head assembly is constructed. This rotary head assembly can be applied to the helical-scanning-type magnetic recording and reproducing apparatus.

Even when a recording/reproduction operation is carried out on a magnetic tape with the thin-film magnetic head 1, azimuthal recording and reproducing must be carried out. Therefore, as stated above, it is necessary to form the MR element Ga and the magnetic gap Gb so that they are inclined by corresponding azimuth angles from the track width direction. However, when the above-described thin-film magnetic head 1 is used in, for example, a hard disk apparatus, the MR element Ga and the magnetic gap Gb become perpendicular to the mounting surface of the base 5, so that, during a recording/reproducing operation using the thin-film magnetic head 1, they are perpendicular to tracks T, and thus have azimuth angles equal to zero degrees. The azimuth angles become zero degrees because the thin-film magnetic head 1 is formed by a manufacturing process in which layers are successively applied on top of a flat wafer. The same thing also applies to an MR element Ga' and a magnetic gap Gb' of another thin-film magnetic head 1 shown in FIG. 6B. In order to form azimuth angles at the MR element Ga and the magnetic gap Gb of the thin-film magnetic head 1 as well as azimuth angles at the MR element Ga' and the magnetic gap Gb' of another thin-film magnetic head 1, the base 5 to which the thin-film magnetic heads 1 are mounted is mounted to the rotary drum D by tilting it by a predetermined azimuth angle with respect to the rotary drum D by a suitable means, so that the magnetic head H1 and the magnetic head H2 are realized, as shown in FIG. 6B.

When a rotary head assembly in which, for example, the MR element Ga and the magnetic gap Gb of the magnetic head H1 are tilted by predetermined azimuth angles in the above-described way is used, the substantially center portions of the MR element Ga and the magnetic gap Gb in the trackwidth-Tw direction (or in the longitudinal direction) lie on the centerline C. Therefore, taking the magnetic head H1 shown in FIG. 7 as an example, the MR element Ga is displaced from the center of a track T1 in the track width direction which has been subjected to recording by means of the magnetic gap Gb.

When reproducing data from tracks T1 and T2, it is preferable that the center portions thereof in the track width direction be subjected to reproducing operations. When, with, for example, the MR element remaining displaced from the centers of tracks T1 and T2 to be reproduced, data is reproduced from tracks T1 and T2 to be subjected to the reproducing operation, edges of tracks T1 and T2 in the widthwise direction thereof are subjected to the reproducing operation, so that the reproducing operation output is reduced. With small width standards for tracks to be subjected to recording by means of the recording gaps Gb and Gb' of inductive heads, and with large size standards for overlapping areas to be subjected to recording, the MR elements Ga and Ga' may extend beyond tracks T1 and tracks T2 to be subjected to the reproducing operation. This reduces the record-signal reproducing operation output. Depending on the sizes of the azimuth angles θ1 and θ2, the distances between the MR element Ga and the magnetic gap Gb and between the MR element Ga' and the magnetic gap Gb', the longitudinal lengths of the MR elements Ga and Ga', etc., the MR elements Ga and Ga' may extend beyond the widths of tracks T1 and tracks T2 to be subjected to the reproducing operation. This reduces the record-signal reproducing operation output.

In double-azimuthal recording and reproducing operations, the MR element Ga of the magnetic head H1 and the MR element Ga' of the magnetic head H2 may be displaced from a track-width center in different directions, or they may be displaced therefrom by different amounts. When, as shown in FIG. 6B, the magnetic heads H1 and H2 are mounted on the rotary drum D, they are mounted by making the end portions defining the recording magnetic gaps Gb and Gb' lie on a center line $H_0$, as shown in FIG. 8A. When these end portions of the MR elements Ga and Ga' are positioned at different heights, a height difference H is produced.

In double-azimuthal recording and reproducing operations, after a track T1 has been subjected to recording by means of the magnetic gap Gb in the magnetic head H1, a recording operation is carried out in an overlapping manner with respect to a portion of the top end of the track T1 in order to subject a track T2 to the recording operation by means of the magnetic gap Gb' in the magnetic head H2. Therefore, when data recorded near an edge of a track in a widthwise direction thereof is reproduced, the reproducing operation may be affected by an adjacent track signal. on the other hand, when data recorded on the center portion of a track in the widthwise direction thereof is reproduced, the reproducing operation output can be increased. However, as viewed from the recording surface side of the magnetic tape shown in FIG. 8B, even when, during a reproducing operation by the magnetic recording and reproducing apparatus, the location of the MR element Ga within track 1 is adjusted (or tracked) so that it is situated at the track-width center where the reproducing operation output becomes maximum, the MR element Ga' reproduces data at a location which is displaced from the track-width center portion of track T2 by the height difference h. This reduces the output of reproduced signals recorded on the track T2.

The azimuth angle θ1 of the MR element Ga and the magnetic gap Gb of the magnetic head H1 and the azimuth angle θ2 of the MR element Ga' and the magnetic gap Gb' of the magnetic head H2 may cause the above-described problems regardless of whether the sizes thereof or inclinations thereof have the same standard values, or whether the standards of the magnetic heads H1 and H2 are different.

SUMMARY OF THE INVENTION

Accordingly, it is an object of the present invention to provide a rotary head assembly used in a helical-scanning-type magnetic recording and reproducing apparatus, which includes an MR head and an inductive head and which can provide a large reproducing operation output when an azimuth angle is provided at a magnetic gap in a thin-film magnetic head.

To this end, according to the present invention, there is provided a rotary head assembly comprising:

a plurality of thin-film magnetic heads with predetermined azimuth angles, each thin-film magnetic head including an inductive magnetic head and a magnetoresistive head placed upon each other to form a layered structure, each inductive magnetic head including a magnetic gap and each magnetoresistive head including a magnetoresistive element, each magnetic gap and each magnetoresistive element being mounted to an outer periphery of a rotary drum so as to be exposed therefrom;

wherein end portions defining the magnetic gaps of the inductive magnetic heads are positioned at a same height; and wherein end portions of the magnetoresistive elements of the magnetoresistive heads are positioned at a same height.

Although not exclusive, the end portions defining the magnetic gaps of the inductive magnetic heads and the end portions of the magnetoresistive elements of the magnetoresistive heads may all be positioned at a same height.

DESCRIPTION OF THE PREFERRED EMBODIMENTS

Figure 1:
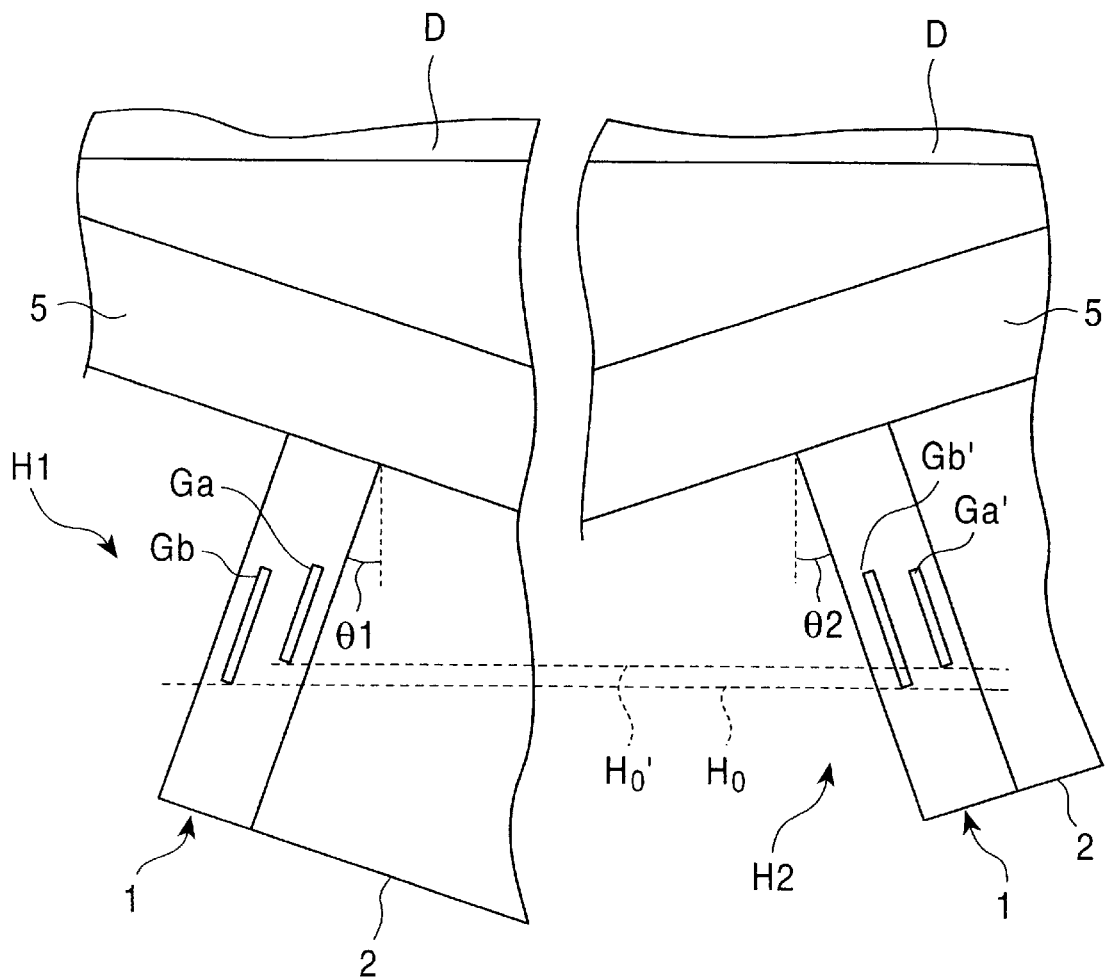
FIG. 1 illustrates a first embodiment of the rotary head assembly in accordance with the present invention.
Figure 2A:
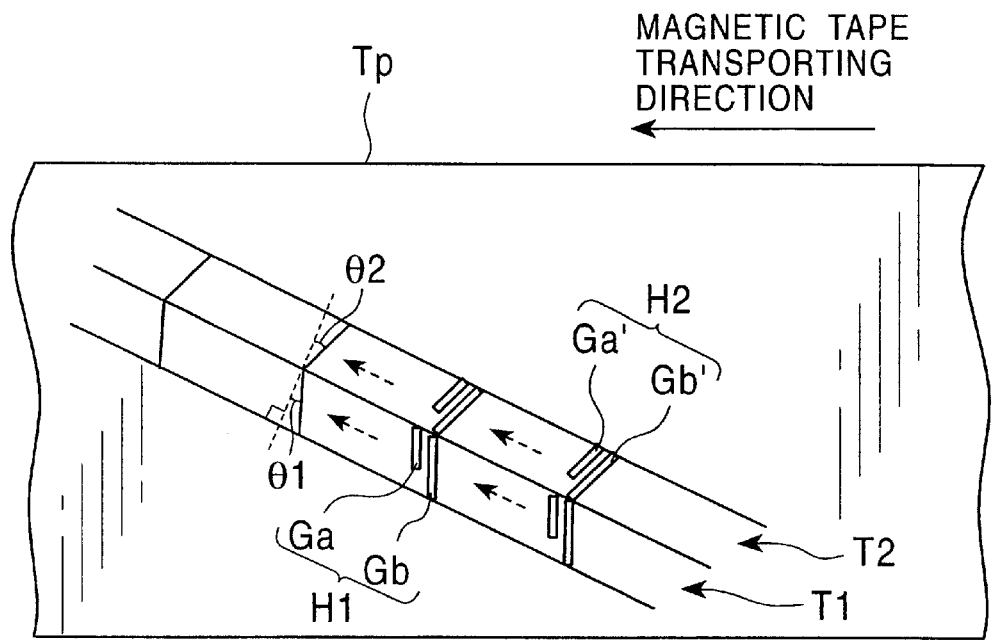
FIGS. 2A and 2B are schematic views illustrating movements of a recording surface of a magnetic tape and magnetic heads when a recording/reproducing operation is performed on the magnetic tape using the rotary head assembly of FIG. 1.
Figure 2B:
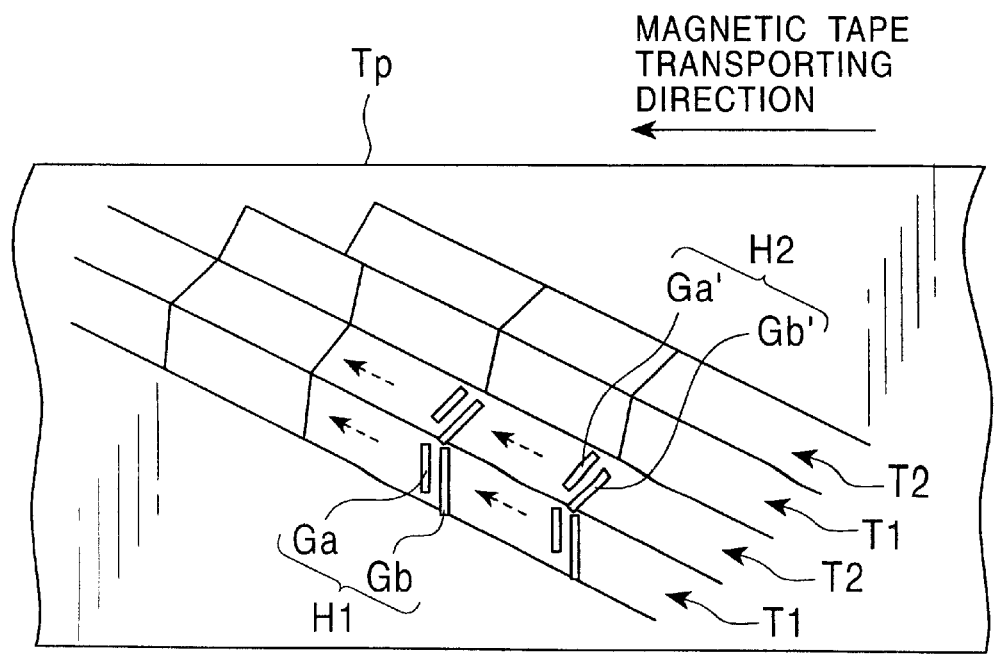
Figure 3A:
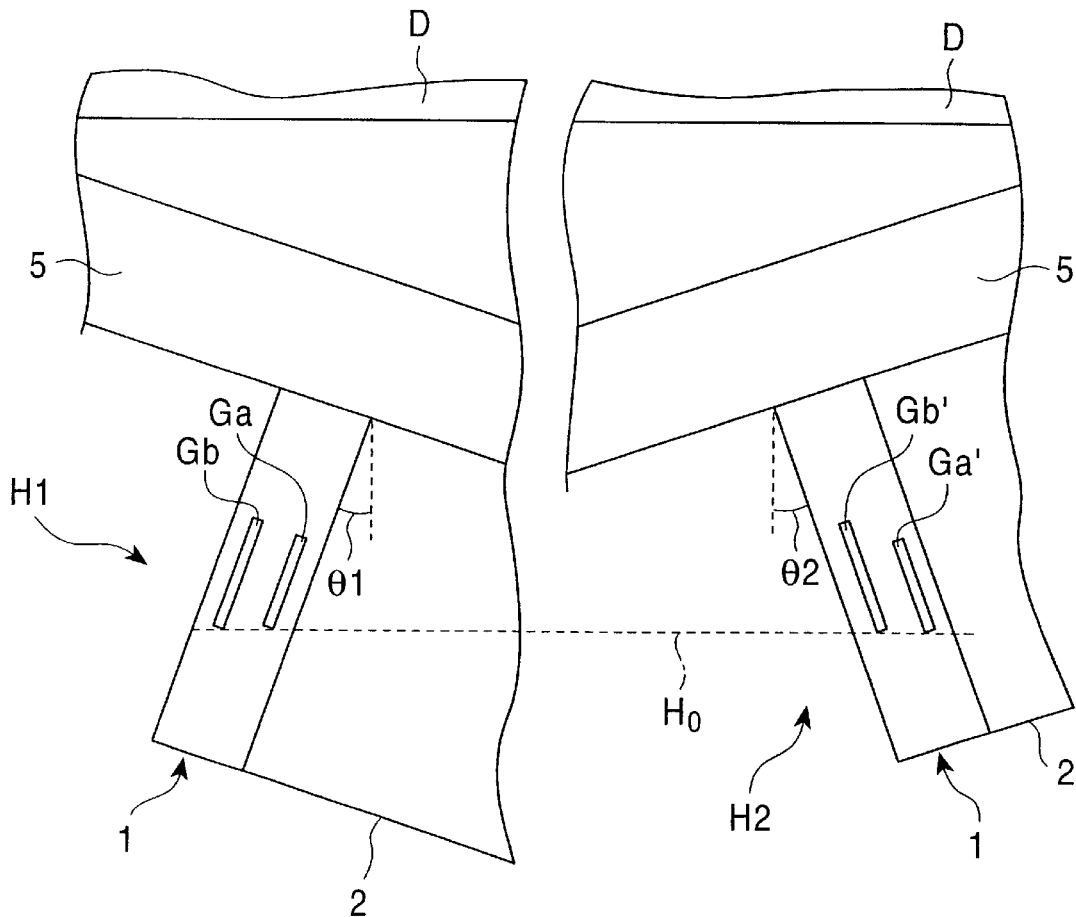
FIGS. 3A and 3B illustrate a second embodiment of the rotary head assembly in accordance with the present invention.
Figure 3B:
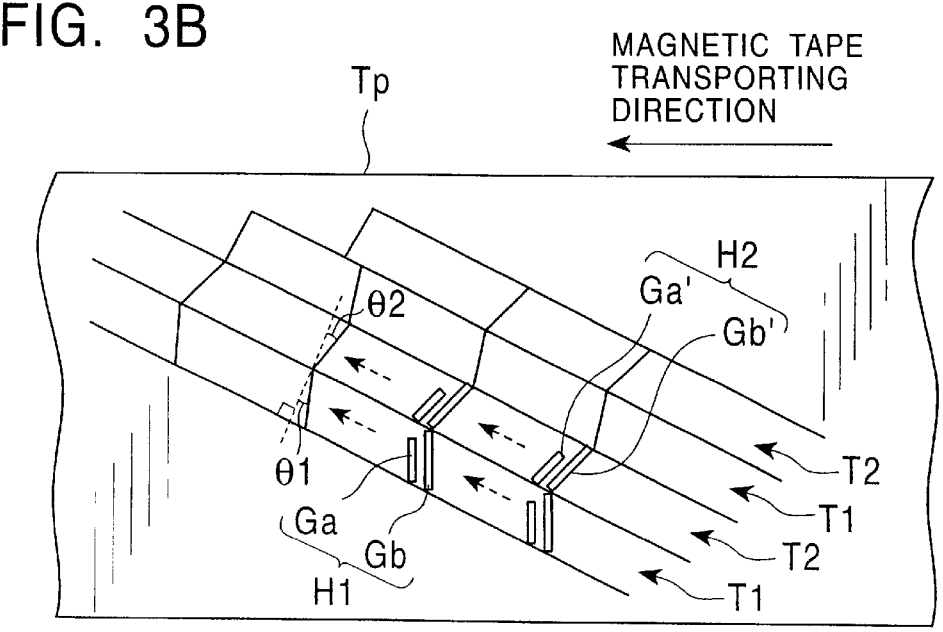
Figure 4A:
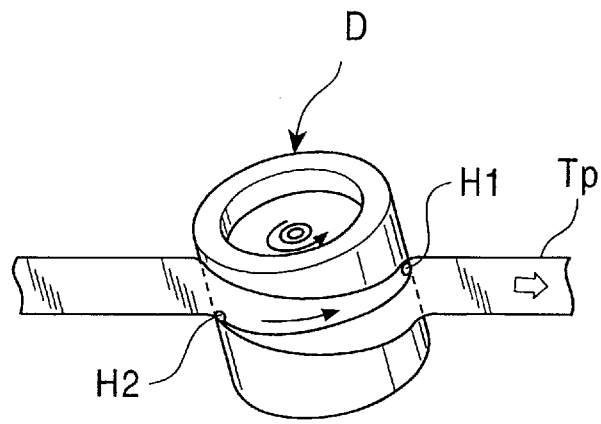
FIGS. 4A and 4B illustrate a conventional helical-scanning-type magnetic recording and reproducing apparatus.
Figure 4B:
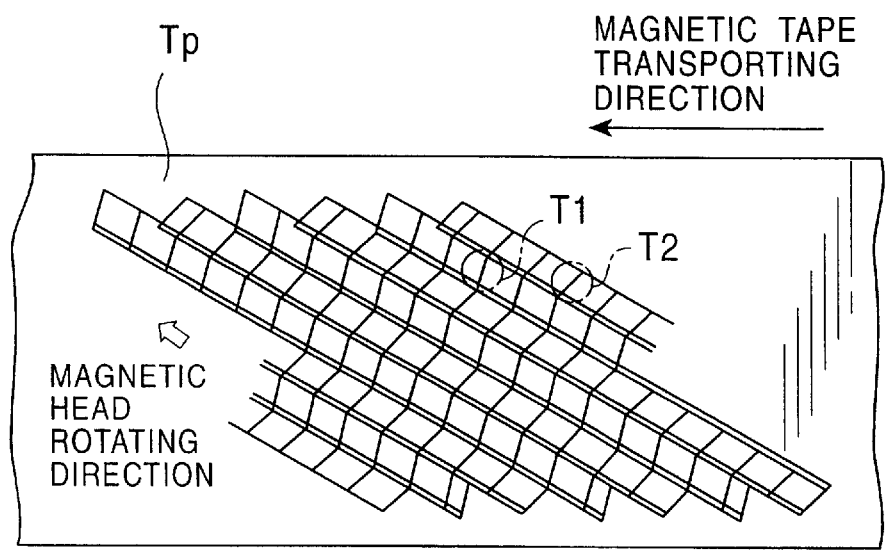
Figure 4B:
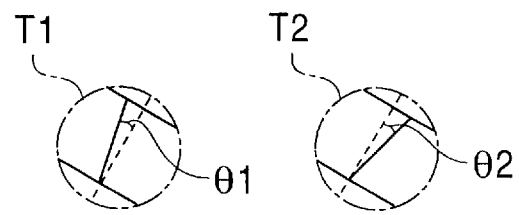
Figure 5A:
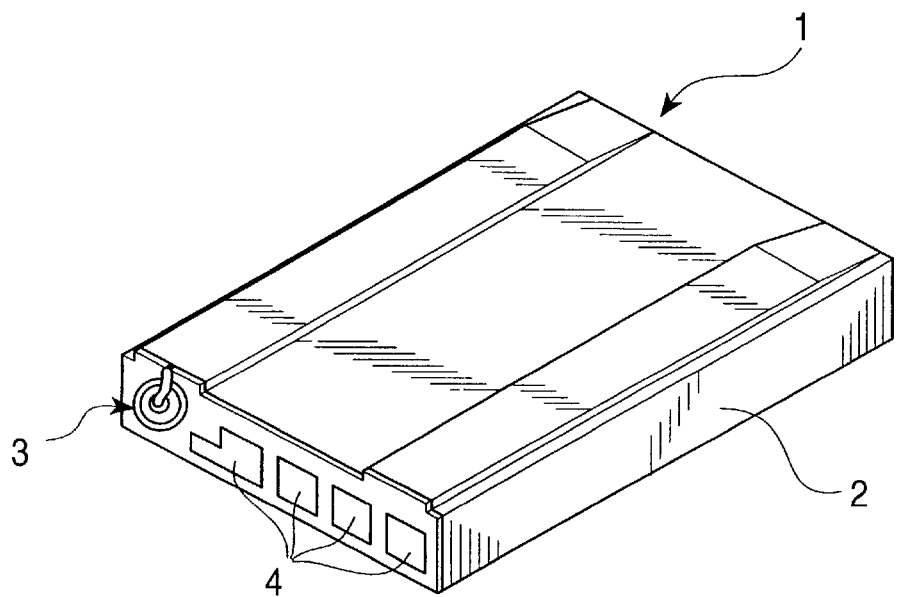
FIGS. 5A and 5B illustrate a thin-film magnetic head used in a magnetic recording and reproducing apparatus such as a hard disk apparatus.
Figure 5B:
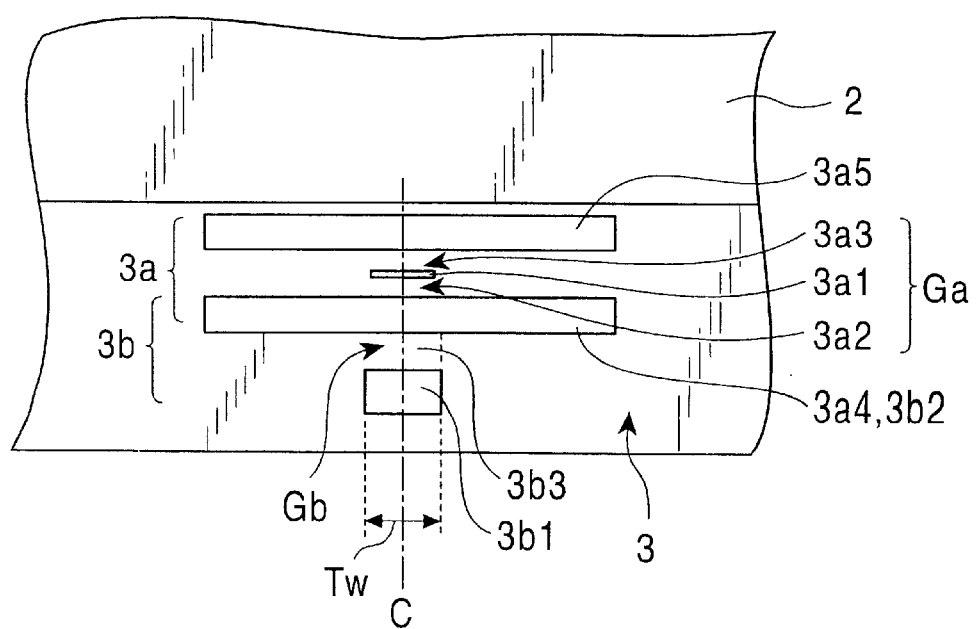

Hereunder, a description will be given of preferred embodiments of the rotary head assembly in accordance with the present invention. FIG. 1 illustrates a first embodiment of the rotary head assembly in accordance with the present invention. More specifically, it is an enlarged view of the main portion of a side surface of a double-azimuthal-type rotary head assembly in which the rotary head assembly is mounted to a rotary drum. FIGS. 2A and 2B are schematic views illustrating movements of a recording surface of a magnetic tape and magnetic heads when a recording/reproducing operation is carried out on a magnetic tape using the rotary head assembly of FIG. 1. FIGS. 3A and 3B illustrate a second embodiment of the rotary head assembly in accordance with the present invention. More specifically, FIG. 3A is an enlarged view of the main portion of a side surface of a double-azimuthal-type rotary head assembly in which the rotary head assembly is mounted to a rotary drum. FIG. 3B is a schematic view illustrate movements of a recording surface of a magnetic tape and magnetic heads when a recording/reproducing operation is carried out on the magnetic tape using the rotary head assembly of FIG. 3A. Component parts similar to those of the conventional example are given the same reference numerals, and part of their descriptions are omitted below.

(First Embodiment)

Figure 6A:
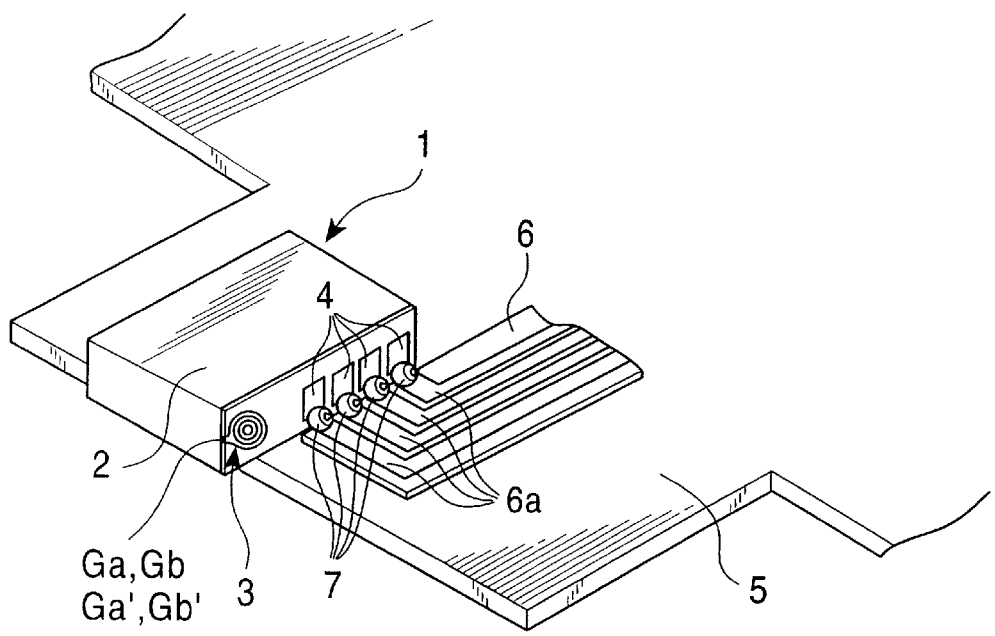
FIG. 6A illustrates a case where the thin-film magnetic head is applied to a helical-scanning-type magnetic recording and reproducing apparatus.
Figure 6B:
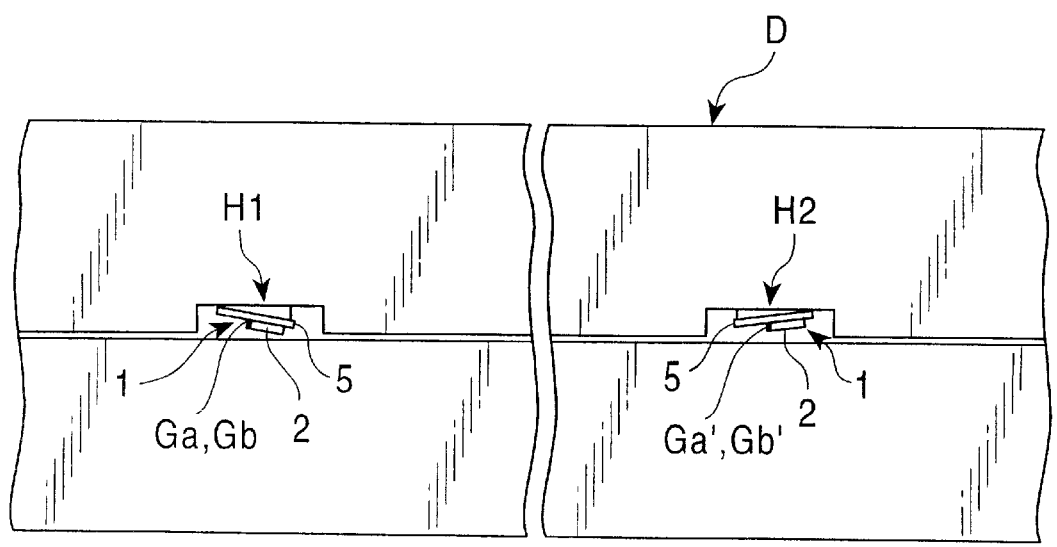
FIG. 6B illustrates a case where two such thin-film magnetic heads are applied to the helical-scanning-type magnetic recording and reproducing apparatus.
Figure 7:
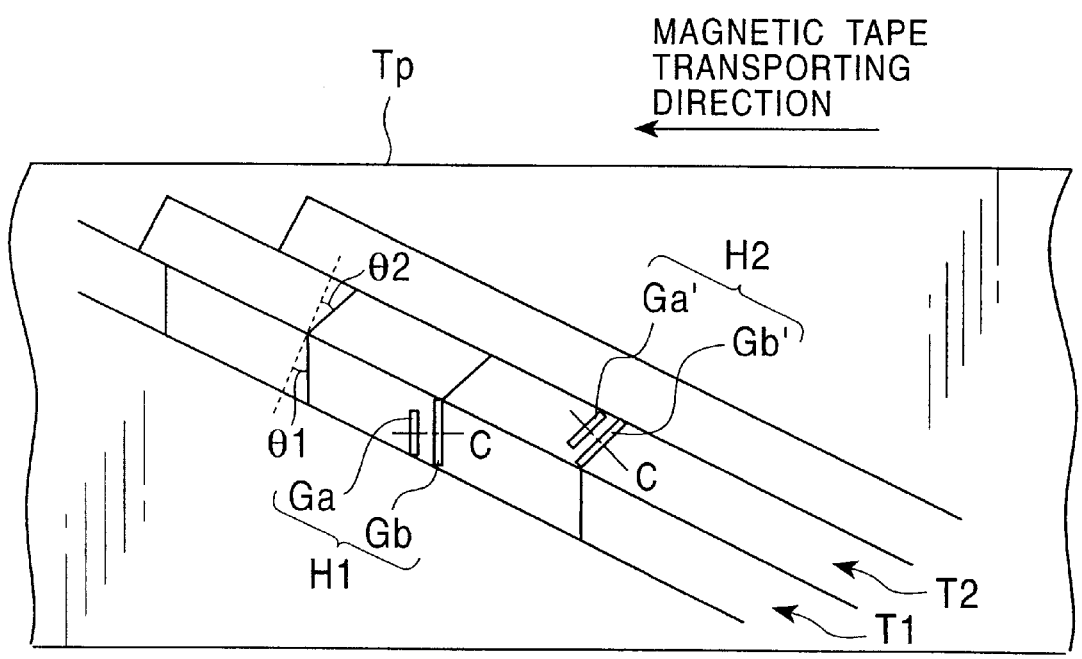
FIG. 7 is a schematic view illustrating movements of a recording surface of a magnetic tape and the magnetic heads when a recording/reproducing operation is carried out using rotary heads of FIG. 6B.
Figure 8A:
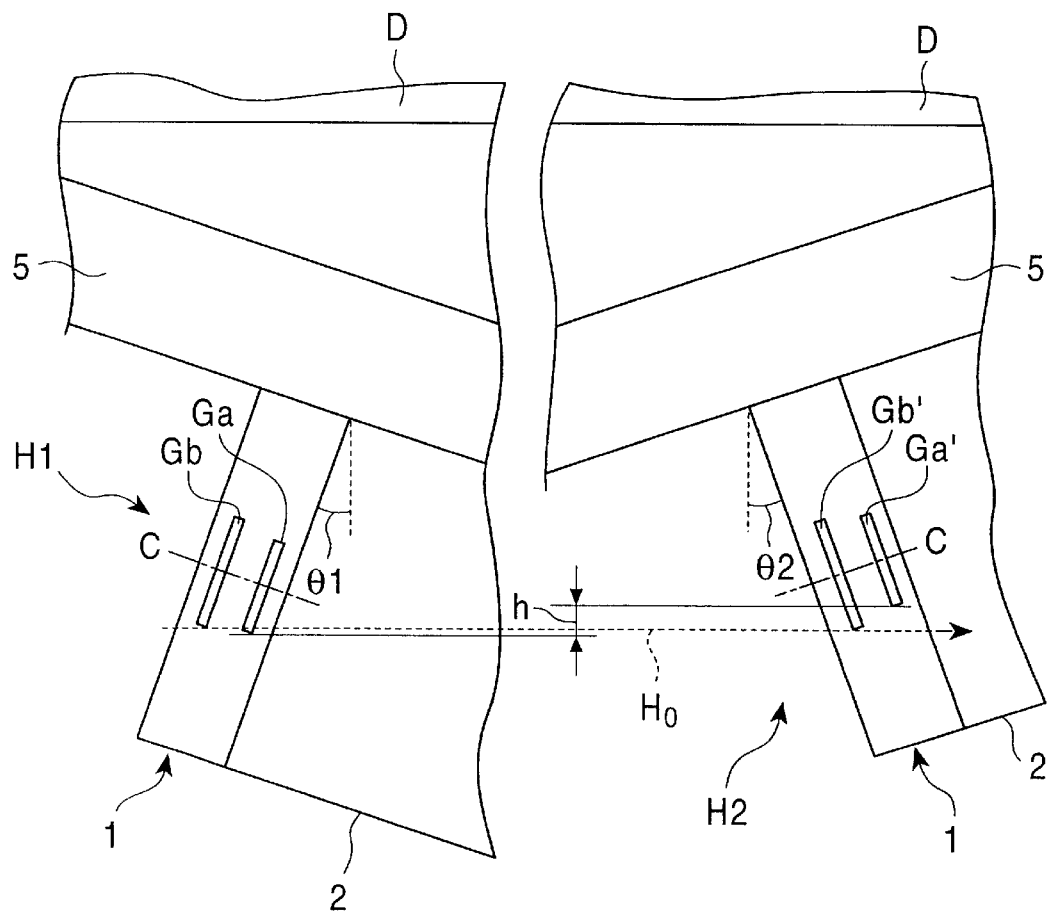
FIGS. 8A and 8B are schematic views illustrate a case where the magnetic tape is subjected to a recording operation and then to a reproducing operation using the rotary heads of FIG. 6B.
Figure 8B:
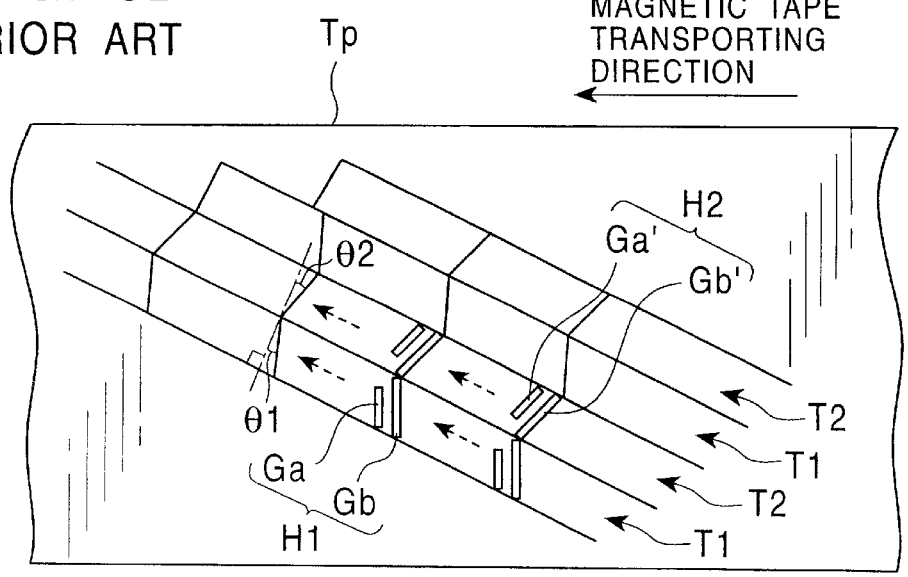

As shown in FIG. 6A, a thin-film magnetic head 1 is mounted to a base 5 so that an MR element Ga and a magnetic gap Gb are exposed from a side portion thereof. Circuit boards 6, such as flexible printed wiring boards, connected to an external processing circuit are provided on the same surface of the base 5 as the thin-film magnetic head 1. Terminal portions 6a of the circuit boards 6 and bonding pads 4 are connected together by balls 7 formed by ball bonding. As shown in FIG. 6B, in order to provide azimuth angles at the MR element Ga and the magnetic gap Gb, the base 5 to which the thin-film magnetic head 1 is mounted is tilted with respect to a rotary drum D by a predetermined azimuth angle $\theta 1$ by a suitable means, and the MR element Ga and the magnetic gap Gb are made to face an outer peripheral surface of the rotary drum D and are mounted at opposite locations of the rotary drum D, whereby a magnetic head H1 is formed. The same applies to an MR element Ga' and a magnetic gap Gb' of another thin-film magnetic head 1. In this case, a magnetic head H2 is formed. The magnetic heads H1 and H2 form a rotary head assembly.

As shown in FIG. 1, in the rotary head assembly of the present invention, an end portion defining the magnetic gap Gb in the thin-film magnetic head 1 of the magnetic head H1 and an end portion defining the magnetic gap Gb' in the thin-film magnetic head 1 of the magnetic head H2 are positioned at a same height $H_0$. Similarly, an end portion of the MR element Ga of the thin-film head section 1 of the magnetic head H1 and an end portion of the MR element Ga' of the thin-film head section 1 of the magnetic head H2 are positioned at a same height $H_0'$, The end portion of the MR element Ga and the end portion defining the magnetic gap Gb are positioned at different heights. Similarly, the end portion of the MR element Ga' and the end portion defining the magnetic gap Gb' are positioned at different heights.

In order to position the MR elements Ga and Ga' of the magnetic heads H1 and H2 at the same height and to position the magnetic gaps Gb and Gb' in the magnetic heads H1 and H2 at the same height when the rotary head assembly is formed, the MR elements Ga and Ga' of MR heads 3a and the magnetic gaps Gb and Gb' in inductive heads 3b are shifted relative to each other by predetermined amounts in a track-width direction (or in a longitudinal direction) in a process carried out to form the thin-film magnetic heads 1. The predetermined shifting amounts are obtained from the azimuth angles $\theta 1$ and $\theta 2$, the distances between the MR element Ga and the magnetic gap Gb and between the MR element Ga' and the magnetic gap Gb', the longitudinal lengths of the MR elements Ga and Ga', and the like.

Hereunder, a description will be given of the process of recording a signal onto and reproducing this signal from a magnetic tape using a double-azimuthal-type recording and reproducing apparatus to which the rotary head assembly incorporating the magnetic heads H1 and H2 including the thin-film magnetic heads 1 is applied, with reference to FIGS. 2A and 2B. FIGS. 2A and 2B illustrate the magnetic tape as viewed from the recording surface side thereof, and the locations of the MR element Ga and the magnetic gap Gb and the locations of the MR element Ga' and the magnetic gap Gb' are reversed when compared to the locations thereof in FIG. 1. As shown in FIG. 2A, when a magnetic tape T1 is to be subjected to a recording operation, data is recorded on a track T1 by means of the magnetic gap Gb in the magnetic head H1. Then, a recording operation is carried out in an overlapping manner with respect to a portion of top end of the track T1 in order to subject a track T2 to the recording operation by means of the magnetic gap Gb' in the magnetic head H2. After the track T2 has been subjected to the recording operation, a recording operation is carried out in an overlapping manner with respect to a portion of a top end of the track T2 in order to subject another track T1 to the recording operation by means of the magnetic gap Gb in the magnetic head H1, and these series of operations are repeated. During the recording operations, although the MR elements Ga and Ga' used for reproducing data are not disposed at the center of tracks T1 and T2 in a widthwise direction thereof, they are not driven. Therefore, this causes no problems.

When data recorded on the tracks T1 and T2 is to be reproduced, tracking is carried out to adjust the positions of the MR elements Ga and Ga' at substantially center portions of the tracks T1 and T2 in the widthwise directions thereof to be reproduced. Tracking is carried out to obtain maximum reproducing operation output. When tracking is carried out, the magnetic gaps Gb and Gb' used for recording are not positioned within the tracks T1 and T2 to be subjected to a reproducing operation. However, since they are not driven, this causes no problems. As mentioned above, the end portions of the MR elements Ga and Ga' are positioned at the same height $H_0'$, so that when the MR element Ga of the magnetic head H1 is adjusted at the center of track T1 in the widthwise direction thereof, the MR element Ga' of the magnetic head H2 is also brought to the center of track T2 in the widthwise direction thereof when reproducing data on the track T2. Therefore, it is possible to increase reproducing operation output.

By forming the thin-film magnetic heads 1 as a result of positioning the height $H_0'$ of the end portions of the MR elements Ga and Ga' at substantially the center in the widthwise direction of the tracks T1 and T2 to be subjected to recording by means of the magnetic gaps Gb and Gb', a high reproducing operation output can be obtained without carrying out a tracking operation.

(Second Embodiment)

In the rotary head assembly of the first embodiment, an end portion defining the magnetic gap Gb and an end portion defining the magnetic gap Gb' are positioned at the same height $H_0$. Similarly, end portions of MR elements Ga and Ga' are positioned at the same height $H_0'$. However, the height $H_0'$ of the end portions of the MR elements Ga and Ga' and the height $H_0$ of the end portions defining the magnetic gaps Gb and Gb' are different. In contrast, in the second embodiment, the height of end portions of MR elements Ga and Ga' and the height of end portions defining magnetic gaps Gb and Gb' are all the same and equal to $H_0$. Even when the heights are all the same, it is possible to reproduce a record signal recorded on the magnetic tape Tp with a high reproducing operation output, as in the first embodiment.

A magnetic recording and reproducing apparatus may be used to record data while confirming the recording state after reproducing recorded signals then and there. In other words, a magnetic recording and reproducing apparatus may be used when a read-after-write operation is to be carried out. In this case, it is preferable that the end portions of the MR elements Ga and Ga' and the end portions defining the magnetic gaps Gb and Gb' all be positioned at the same height $H_0$.

Although in the above-described embodiments the magnetic head H1 and the magnetic head H2 are positioned at opposing locations of the rotary drum D, three or more magnetic heads may be disposed at the rotary drum in order to form a rotary head assembly.

In addition, although in the above-described embodiments azimuth angles are provided by tilting the base 5, to which the thin-film magnetic heads 1 are mounted, by predetermined angles with respect to the rotary drum D, the azimuth angles may be provided in other ways. For example, they may be provided by chamfering slider-2 surfaces of the thin-film magnetic heads 1 which come into contact with the base 5 in correspondence with the sizes of the azimuth angles, and mounting the chamfered slider-2 surfaces of the thin-film magnetic heads 1 to the base 5; or by mounting the base 5 parallel to a lower surface of the rotary drum D.

According to the present invention, the rotary head assembly comprises a plurality of thin-film magnetic heads with predetermined azimuth angles, each thin-film magnetic head including an inductive magnetic head and a magnetoresistive head, each inductive magnetic head including a magnetoresistive element and each magnetoresistive head including a magnetic gap, each magnetoresistive element and each magnetic gap being mounted on an outer periphery of a rotary drum so as to be exposed therefrom; wherein end portions of the magnetoresistive elements of the inductive magnetic heads are positioned at a same height; and wherein end portions defining the magnetic gaps of the magnetoresistive heads are positioned at a same height. Therefore, when the MR element of one magnetic head is positioned at an optimal location within one track so that the reproducing operation output becomes maximum, the MR element of another magnetic head is positioned at an optimal location within another track when data is reproduced from this track. Consequently, it is possible to increase reproducing operation output.

The rotary head assembly may be such that the end portions of the magnetoresistive elements of the inductive heads and the end portions of the magnetic gaps in the magnetoresistive heads are all positioned at a same height. Even in this case, when an MR element of one magnetic head is positioned at an optimal location within one track so that the reproducing operation output becomes maximum, an MR element of another magnetic head is positioned at an optimal location within another track when data is reproduced from this track. Therefore, it is possible to increase the reproducing operation output. In addition, when a read-after-write operation is to be carried out, it is possible to provide optimal reproducing operation output.

What is claimed is:

1. A rotary head assembly for use in a helical-scanning-type magnetic recording and reproducing apparatus comprising:

a plurality of thin-film magnetic heads mounted on an outer periphery of a rotary drum so as to be exposed from an outer surface thereof, each said thin-film magnetic head being disposed along a predetermined azimuth angle that is acute to an axis of rotation of said rotary drum, each said thin-film magnetic head comprising an inductive magnetic head and a magnetoresistive head placed adjacent to each other to form a layered structure, each said inductive magnetic head including a magnetic gap having a first end portion and a second end portion, and each said magnetoresistive head including a magnetoresistive element having a first end portion and a second end portion;

wherein the first end portion of the magnetic gap of each of said inductive magnetic heads is disposed in a first plane that is perpendicular to an axis of rotation of said rotary drum; and wherein the first end portion of the magnetoresistive element of each of said magnetoresistive heads is disposed in a second plane that is perpendicular to the axis of rotation of said rotary drum.

2. A rotary head assembly according to claim 1, wherein said first plane is coincident with said second plane.

* * * * *